United States Patent [19]
Schick

[11] 3,751,711
[45] Aug. 7, 1973

[54] LIGHTING DEVICE FOR ROAD VEHICLES

[75] Inventor: George-Robert Schick, Prilly, Switzerland

[73] Assignee: Schick & Cie, Prilly, Canton of Vaud, Switzerland

[22] Filed: Oct. 7, 1970

[21] Appl. No.: 78,856

[30] Foreign Application Priority Data
Oct. 9, 1969  Switzerland.................... 15181/69

[52] U.S. Cl. .................. 315/83, 240/DIG. 6
[51] Int. Cl. .................................. B60q 1/14
[58] Field of Search .............. 240/DIG. 6, 41.35, 240/8.6; 350/290, 288, 318, 165; 315/83; 250/214 D

[56] References Cited
UNITED STATES PATENTS

| | | | |
|---|---|---|---|
| 1,245,241 | 11/1917 | Kendig............................ | 240/DIG. 6 |
| 1,575,327 | 3/1926 | Garford et al. .............. | 240/41.35 D |
| 2,124,737 | 7/1936 | Jenking et al................ | 240/41.35 D |
| 3,000,262 | 9/1961 | Rabinow et al............... | 350/290 X |
| 1,533,615 | 4/1925 | Schwartz....................... | 240/41.35 D |
| 1,442,681 | 1/1923 | Craig ............................ | 240/41.35 D |
| 2,423,278 | 7/1947 | Willis, Jr....................... | 315/83.1 X |
| 3,026,446 | 3/1962 | Martin et al................... | 315/83.1 X |
| 2,341,827 | 2/1944 | Sukumlyn ..................... | 350/165 |
| 3,088,051 | 4/1963 | Scanlon ........................ | 315/83.1 X |
| 2,807,752 | 9/1957 | McIlvaine ..................... | 250/214 D |
| 2,896,089 | 7/1959 | Wesch ........................... | 250/214 D |

*Primary Examiner*—Richard C. Queisser
*Assistant Examiner*—Daniel M. Yasich
*Attorney*—Stevens, Davis, Miller & Mosher

[57] ABSTRACT

An automatically operated lighting device for road vehicles including headlights capable of being switched to a main beam position and to a dipped beam position, a cell including a light sensitive detectror for capturing light at the front of the vehicle and a control circuit, responsive to the detector, for operating the headlights so as to switch them from one position to the other when the intensity of the captured light passes a fixed limit. The headlights include a filter which reduces to a fraction the specific intensity of a predetermined wavelength range of the light emitted by a light source within the headlights. The sensitivity of the detector is a maximum in the range filtered by the filter.

10 Claims, 4 Drawing Figures

LIGHTING DEVICE FOR ROAD VEHICLES

It is known that in order to make a suitably reliable device of this kind, it is necessary to protect the detector from the effects of light from the vehicle's own lights reflected on the road or on vertical surfaces along the latter. It has already been proposed to achieve this result by making a differential detector consisting of a part sensitive to reflections and a part sensitive to direct emissions of light. However, the sensitive parts must then have a very marked directional effect so that the regulation of the device and its maintenance in a correct position come up against great difficulties. In addition, the fact that the headlights on ordinary cars are becoming more and more powerful increases still further the difficulty of precise regulation of the sensitivity of the detector.

The purpose of the present invention is to overcome these drawbacks.

For this, the device forming the subject of the present invention is distinguished by the fact that the headlights are designed so that the spectrum of luminous radiation they give off possesses a given band in which the specific intensity (i.e., the spectral concentration of radiant power or radiant flux) of the light given off is less than that of the light given off by an ordinary headlight and by the fact that within this band the detector possesses a higher degree of sensitivity than in the rest of the spectrum.

The attached drawings illustrate and make it possible to understand the working of a form of execution of the device forming the subject of the invention.

Figure 4:
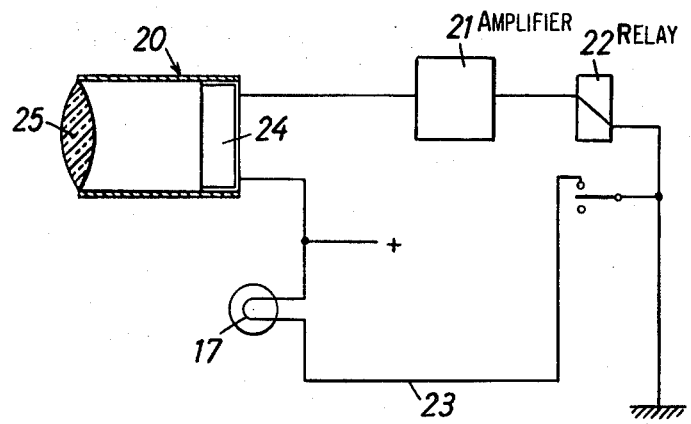
FIG. 4 is a partially schematic view of a conventional automatic control device for use in the present invention.

The main elements of a device for the automatic control of the headlights of an automobile, as schematically illustrated in FIG. 4, being well known, as shown in U.S. Pat. No. 3,319,116 by the present inventor, it will not be necessary to describe them in detail here. These main elements consist of a cell 20 acting on a transistorized amplifying circuit 21 controlling a relay 22 connected up to the headlight circuit 23. The cell can be composed for example of a light-sensitive resistance or detector 24 combined with an optical system 25 and held by a support so as to be located at the front of the vehicle and to be pointed according to the axis of displacement of the latter. When the control device is designed as described below, the optical system of the cell can be very simple and limited to a simple lens or a diffusion screen placed in front of the light-sensitive resistance. It is not necessary to limit the optical angle within which the detector captures the incident light. This angle may amount, for example, to 40°. The light-sensitive resistance is connected up to the transistorized circuit in such a way that for a certain value of the current passing through it, corresponding to a certain light intensity captured, the circuit trips and causes the headlights to switch from the main beam to the dipped beam or vice-versa.

For the device to work properly, the detector must obviously be capable of reacting to the effect of the light given off by the red rear-lights of a car in front of it at a distance of 100 to 150 yards and at the same time be unaffected by the light from the car's own headlights reflected on the road or from the vertical surfaces along it, such as for example walls or roadsigns, or boundary posts even when fitted with reflecting discs. In order to achieve this result, it is planned to design the lighting device and cell as follows.

Figure 1:
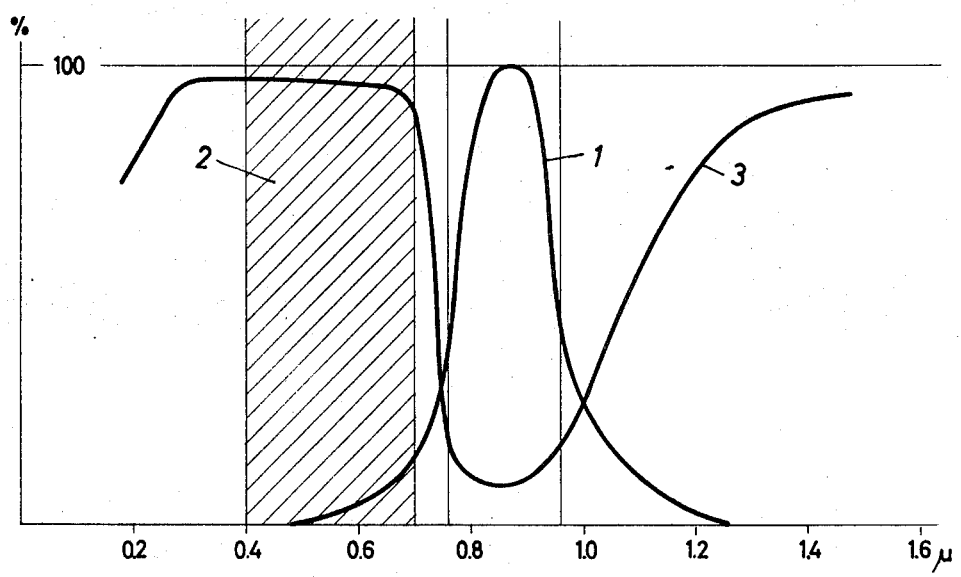
FIGS. 1 and 2 are graphs explaining the working of the various elements of the device.

First of all, use is made of a detector that is sensitive only in a very limited zone of wavelengths. Light-sensitive resistances of this kind exist on the market. Curve 1 in FIG. 1 shows diagrammatically the sensitivity of such a detector in terms of the wave-length of the incident light. On this graph, the band of wave-lengths corresponding to visible light is represented by the shaded area 2. It can be seen that it covers the wave-lengths extending approximately from 0.4 to $0.7\mu$. The sensitivity curve 1 on the other hand starts to differ appreciably from zero only for wavelengths in the neighborhood of $0.7\mu$, while the maximum sensitivity is reached between 0.8 and $0.9\mu$. As the wave-lengths get bigger still, the sensitivity decreases again. It is easy to see that if we place in front of the car's headlights a screen or filter having a selective effect like that indicated by curve 3 on graph 1, the light given off by the car's own headlights will have practically no effect on the detecting device. Curve 3 on graph 1 represents the value of the coefficient of transmission of the filter in terms of the wave-length. It can be seen that this coefficient is very close to 1 throughout the whole zone of visible light, i.e. from 0.4 to $0.7\mu$, but falls off considerably as soon as it reaches the $0.7\mu$ mark, i.e. the infrared zone. It falls to a minimum between 0.8 and $0.9\mu$, which means that the filter is almost opaque to radiations possessing this wave-length. The coefficient of transmission increases again beyond $0.9\mu$.

Figure 2:
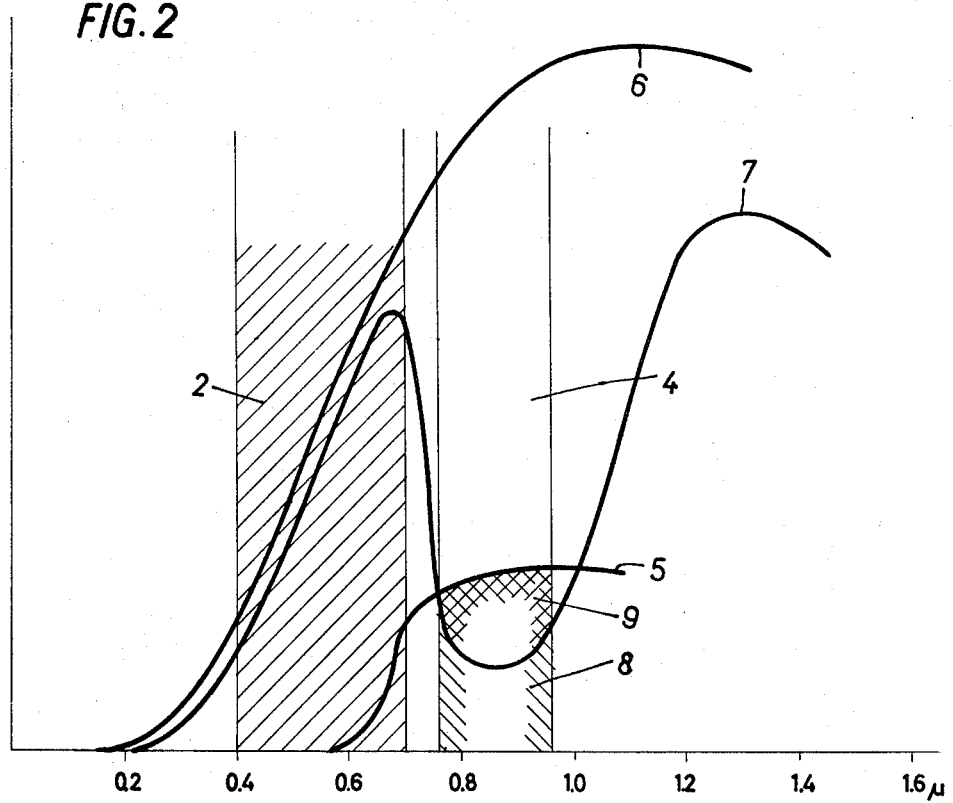

The effect of such a filter on the emission of light from the headlights of a car fitted with the device is shown diagrammatically in FIG. 2. In this graph, we see again zone 2 corresponding to visible light. Zone 4 corresponds to the zone of actual sensitivity of the detector. Curve 5 shows, in terms of the wave-length, the specific light intensity captured by a detector when the only incident light is that of the red rear-lights of an ordinary automobile located some 150 yards in front of it. This specific light intensity is naturally nil in the band of shortest visible wave-lengths. It differs from zero in the zone of red visible light and, as is the case with all incandescent lamps, increases strongly once one passes from visible light to infra-red. Curve 6 is similar to curve 5 except that it refers to the light intensity captured by the same detector when the only incident light is that of the car's own headlights reflected on a metal panel situated for example some 30 yards in front of it. It can be seen that, in the case considered here for the whole zone of visible and infra-red wave-lengths, the specific intensity of this reflected light is much stronger than that of the red lights of a car placed in conditions corresponding to curve 5. Curve 7 on the other hand downs the specific intensity captured by the detector when the car's own lights are fitted with the filter defined by curve 3 on graph 1. It is easy to understand that, thanks to the filter, the specific intensity captured by the detector in the zone lying for example between 0.8 and $0.9\mu$ can be reduced, for the conditions described, to a value much lower than that produced by the red rear-lights of an ordinary car. The effect of the detector on the electronic control circuit, i.e. the variation in the resistance of this detector, will be proportional to the value of the integrated specific intensity throughout the whole band of sensitivity. When the only light captured is that from the car's own headlights, this quantity of integrated light will correspond approximately to the area of the shaded zone 8 lying between the edges of zone 4 and the curve 7. On the other hand, when the detector receives no other light than that from red rear-lights, the value of the integrated specific intensity is shown by the cross-shaded area 9 lying between the curve 5 and the edges of zone 4. It can be seen that it is possible to regulate the control device in such a way that the headlights are not switched from the main beam position to the dipped beam position when the integrated intensity corresponds to the value represented by zone 8 whereas they are automatically switched over whenever the integrated intensity reaches the values represented by zone 9.

It will be noticed that curve 3 does not go down as far as zero in the detector's zone of sensitivity. It is necessary in fact for the detector to be slightly influenced by the light given off by headlights equipped with the filter in question so that the control device may react also if a car fitted with the same device is coming towards it from the opposite direction, with its headlights in the main beam position. This emission of light of reduced intensity but differing from zero captured directly by the detector will affect it in such a way that switching to the dipped position will occur as soon as the switching level of the detector has been reached. In addition, the specific intensity of the emission of light captured directly is greater, in the zone situated beyond 1, than that of the same light after being reflected, since the reflecting surface absorbs the infra-red rays.

The rear-lamps on ordinary automobiles generally have a power in the neighborhood of 20 W and this light is partly absorbed by the red screen covering them, whereas the power of emission of headlights is in the neighborhood of 130 W and the lamps are placed inside a carefully designed parabolic reflector. It is easy to understand therefore that the emission of light from the headlights of a car even when reduced 80 percent, in a narrow band of the infra-red by the presence of a filter, can even so at a distance of 1,000 yards equal that of a simple red rear-light 150 yards away and not reduced in this band.

There are different ways of making a filter with the selective effect defined by curve 3 of graph 1. Each of the three main parts of the headlight: the lamp 10, the parabolic reflector 11 and the protective glass 12, can be designed specifically to obtain this effect.

It is known at present how to make sheets of glass with selective transmission by depositing a thin layer of metal on one of their faces. A coating of this kind has in fact the property of being transparent for certain bands of wave-lengths and at least partially reflecting for the other wave-lengths of the spectrum. The reflecting band will vary in width and in position in the spectrum according to the composition of the layer, while the intensity of the reflection will be stronger or weaker depending on its thickness. It should be noted that the selective effect of such a thin layer on a sheet of glass is such that in the bands that are not reflected, the presence of the layer has practically no tendency to diminish the coefficient of transmission of the glass. The reduction is of the order of a few percent only. In these bands, the glass is therefore practically as transparent as without the metal coating. By using a suitably selected mixture of metallic elements and silicon, in particular a mixture containing gold, it is possible to obtain a glass whose coefficient of transmission is similar to that represented by curve 3. Other curves can be obtained with other metals or other mixtures of metals. The process of preparing a selective glass of this kind is well known. It may in particular comprise the depositing of the metal layer by vacuum vaporization.

One can see therefore that if the inside of the glass 12 protecting the headlight is coated with such a layer of metal, or if a selective glass screen itself coated with a layer of metal is placed inside this glass, the rays emitted by the lamp and reflected by the reflector will pass through the protective glass or will be partially reflected towards the inside of the light depending on their wave-length. As the band of reflection is situated within a narrow band of the infra-red, the presence of such a screen has practically no effect on the visible light given off by the headlight. On the other hand, the beam of light leaving the headlight through the screen, once reflected on the road or reflecting surfaces has only a very slight effect on a detector with a narrow band of sensitivity contained in fact in the zone where the light emitted is extinguished.

Figure 3:
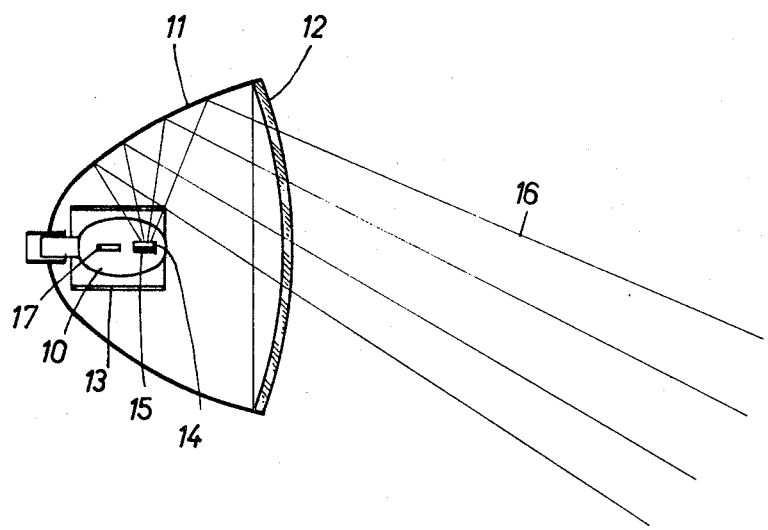
FIG. 3 is a diagrammatic sectional view of a headlight fitted with a plurality of filtering elements.

Instead of making the protective glass as indicated above, it is also possible to manufacture the lamp 10 in a glass covered with a thin coating providing selective reflection. It is also possible, as can be seen in FIG. 3, to surround the lamp with a tubular screen 13 made of selective reflection glass. In FIG. 3, the headlight is shown set to dipped position and the rear filament 14 alone is lit. It is situated above an opaque screen 15 so that it only emits upward. Being located in front of the focus of the reflector, the light that it gives off is reflected in the form of a divergent beam pointing downwards.

When the filament 17 situated in the focus of the reflector is switched on alone, the luminous emission is reflected in the form of a practically parallel beam pointing along the axis of the headlight. The selective reflection of the protective filter also eliminates the wave-lengths of the unwanted band from this beam.

Instead of using selective reflection glasses like those described above, it is also possible to use selective absorption glasses. In fact, by incorporating certain elements, in particular dyes or metal elements, in the mass of the glass, the latter can be given a coefficient of transmission varying selectively according to the wavelength. Lead in particular, incorporated in the glass, tends to absorb the infra-red rays. The well-known catathermic glasses are obtained in this way. Although glasses of this kind can also be considered, it would seem that the use of selective reflection glasses is more economical in the application described above, owing to the fact that it is much more difficult to obtain a selective absorption glass with a very clearly defined band of absorption and in particular a band extending from about 0.7 to 1 $\mu$ than to obtain selective reflection glasses effective over the same range.

Finally, instead of specially designing the emission lamp or the protective glass so as to obtain the desired selective emission, it is also possible to give the parabolic reflector 11 of the headlight a special treatment. Thus, the surface of this reflector can be treated so that it cuts out the unwanted wavelengths in the beam of light emitted. Here too, it is possible to consider treating the reflector so that the wave-lengths one wishes to eliminate are either absorbed or not reflected, or treating it in such a way that it is transparent for these wavelengths. In the latter event, the radiations lying, for example, in the band extending from 0.7 to 1 μ will pass directly through the reflector. The specific intensity of these radiations in the beam of the headlight will be a result only of the direction radiations of the lamp. It will be much weaker than that of the other radiations that are reflected by the reflector, and, in the main beam position, concentrated in a practically parallel beam.

The combined use of a selective emission headlight providing a band of extinction in the infrared and a selective sensitivity detector whose sensitivity is limited to this band makes it possible to simplify the making of the light-sensitive detector. It is not necessary for this detector to have a very marked directional effect, so that its fitting and adjustment on the car do not require any very great precision. However, the control circuit of the device may, if wished, comprise various elements designed to increase its reliability even further. Thus it is possible to provide a timing element which, when switching from the main beam to the dipped beam, prevents any switching back in the reverse direction for a given period of time starting from the moment of switching, this length of time being of the order of 1 or 2 seconds or even longer depending on the case. Such a device is described in particular in Swiss Patent No. 509,895.

What is claimed is:

1. An automatically controlled lighting device for a vehicle, comprising:
   a. at least one front headlight including a light source, said front headlight having a high beam and a low beam output;
   b. selective light modifying means on at least one selected inner portion of the headlight for reducing the specific intensity of a selected portion of the output light emanating from said headlight in a direction substantially parallel to the axis of forward movement of the vehicle to a fraction of the specific intensity of the selected portion of light emitted by said light source, said selected portion comprising light having wavelengths in the range of about $0.7 \times 10^{-3}$ mm to about $1.0 \times 10^{-3}$ mm wherein the specific intensity of the visible portion of the light emitted by said light source and emanating from said headlight is substantially unimpaired;
   c. a photosensitive detector, for receiving light at the front of the vehicle, said detector being selectively sensitive to specific wavelengths of light, the sensitivity of said detector having a maximum value in the range of light wavelengths of about $0.7 \times 10^{-3}$ mm to about $1.0 \times 10^{-3}$ mm; and
   d. means for changing the output light from one beam to another, said changing means including a control circuit connected to said detector and said headlight, said output light being changed from said high beam to said low beam when the specific intensity of light in said range received by said detector exceeds a fixed critical value.

2. A device according to claim 1, wherein said headlight includes a parabolic reflector and a front glass, said light source comprises a bulb having a pair of filaments therein, and said selective means comprises a cylindrical screen placed around said bulb and coaxial with said parabolic reflector, said screen comprising a coated glass material which selectively absorbs light having wavelengths in said range.

3. A device according to claim 1, wherein said headlight includes a parabolic reflector and a front glass, said light source comprises a bulb having a pair of filaments therein, and said selective means comprises a cylindrical screen placed around said bulb and coaxial with said parabolic reflector, said screen comprising a coated glass material selectively reflecting light having wavelengths in said range.

4. A device according to claim 1, wherein said headlight includes a parabolic reflector, said light source comprises a bulb having a pair of filaments therein, and said selective means comprises a front glass closing the space within the reflector containing said bulb, said front glass comprising a coated transparent material which selectively modifies the light by reducing said specific intensity of the output light having wavelengths in said range.

5. A device according to claim 1, wherein said headlight includes a parabolic reflector and a front glass, and said light source comprises a bulb having a pair of filaments therein and a bulb envelope comprising a coated transparent material which selectively modifies the light by reducing said specific intensity of the output light having wavelengths in said range.

6. A device according to claim 1, wherein said headlight includes a parabolic reflector and a front glass, and said light source comprises a bulb having a pair of filaments therein, and said selective means comprises a selectively reflective coating on said parabolic reflector, said coating also being selectively transparent to light comprising wavelengths in said range.

7. A device according to claim 1, wherein said headlight includes a parabolic reflector and a front glass, said light source comprises a bulb having a pair of filaments therein, and said selective means comprises a coating on the envelope of said bulb, said coating selectively modifying the light by reducing said specific intensity of the output light having wavelengths in said range.

8. A device according to claim 1, wherein said headlight includes a parabolic reflector and a front glass, said light source comprises a bulb having a pair of filaments therein, and said selective means comprises a selectively light modifying coating provided on said front glass, said coating modifying the light by reducing said specific intensity of the output light having wavelengths in said range.

9. A device according to claim 1, wherein said headlight comprises a parabolic reflector and a front glass, said light source comprises a bulb having a pair of filaments therein, and said selective means comprises a screen disposed parallel to said front glass in the path of the output light beam of said headlight, said screen comprising an otherwise coated transparent material which modifies the light by reducing said specific intensity of the output light having wavelengths in said range.

10. A device according to claim 1, wherein the fraction of the specific intensity to which the intensity of the selected portion is reduced is less than 20 percent.

* * * * *